United States Patent
Klode

(10) Patent No.: US 11,820,494 B2
(45) Date of Patent: Nov. 21, 2023

(54) ELECTROMECHANICAL ACTUATOR DISCONNECT

(71) Applicant: GOODRICH CORPORATION, Charlotte, NC (US)

(72) Inventor: Harald Klode, Centerville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/084,392

(22) Filed: Dec. 19, 2022

(65) Prior Publication Data
US 2023/0117136 A1   Apr. 20, 2023

Related U.S. Application Data

(62) Division of application No. 16/776,202, filed on Jan. 29, 2020, now Pat. No. 11,560,218, which is a (Continued)

(51) Int. Cl.
*B64C 25/20* (2006.01)
*B64C 25/24* (2006.01)
(Continued)

(52) U.S. Cl.
CPC .............. *B64C 25/20* (2013.01); *B64C 25/24* (2013.01); *B64C 25/40* (2013.01); *B64C 25/60* (2013.01); *F16H 25/2204* (2013.01); *H02K 7/14* (2013.01); *B64C 25/26* (2013.01); *B64C 25/34* (2013.01); *F16H 2025/2071* (2013.01); *F16H 2025/2075* (2013.01)

(58) Field of Classification Search
CPC ......... B64C 25/20; B64C 25/24; B64C 25/26; F16H 25/2006; F16H 25/2025; F16H 2025/204; F16H 2025/2021
USPC ....................................................... 244/102 R
See application file for complete search history.

(56) References Cited

U.S. PATENT DOCUMENTS

| 2,642,752 A | 6/1953 | Geyer et al. |
| 2,660,026 A | 11/1953 | Geyer |

(Continued)

FOREIGN PATENT DOCUMENTS

| CN | 102530244 | 4/2014 |
| CN | 107407384 | 11/2017 |

(Continued)

OTHER PUBLICATIONS

USPTO, Requirement of for Restriction dated May 17, 2019 in U.S. Appl. No. 15/599,318.

(Continued)

*Primary Examiner* — Christopher P Ellis
(74) *Attorney, Agent, or Firm* — SNELL & WILMER L.L.P.

(57) ABSTRACT

A method of operating an electromechanical actuator includes coupling an inner portion of a split ball screw with an outer portion of the split ball screw, rotating the split ball screw about an axis to drive a ball nut in a first axial direction, in response to a failure mode of the electromechanical actuator, decoupling the outer portion of the split ball screw from the inner portion of the split ball screw, and translating the outer portion of the split ball screw and the ball nut in a second axial direction.

5 Claims, 8 Drawing Sheets

Related U.S. Application Data division of application No. 15/599,318, filed on May 18, 2017, now Pat. No. 10,583,917.

(51) Int. Cl.

| | | |
|---|---|---|
| *F16H 25/22* | (2006.01) | |
| *B64C 25/60* | (2006.01) | |
| *B64C 25/40* | (2006.01) | |
| *B64C 25/26* | (2006.01) | |
| *B64C 25/34* | (2006.01) | |
| *F16H 25/20* | (2006.01) | |
| *H02K 7/14* | (2006.01) | |

(56) References Cited

U.S. PATENT DOCUMENTS

| | | | |
|---|---|---|---|
| 2,886,008 | A | 5/1959 | Geyer et al. |
| 3,954,232 | A | 5/1976 | Harper |
| 4,745,815 | A | 5/1988 | Lopfenstein |
| 5,655,636 | A | 8/1997 | Lang et al. |
| 8,499,653 | B1 | 8/2013 | Sheahan, Jr. |
| 8,714,479 | B1 | 5/2014 | Chapman |
| 9,506,543 | B2 | 11/2016 | Naubert et al. |
| 2002/0182006 | A1 | 12/2002 | Capewell et al. |
| 2003/0188948 | A1 | 10/2003 | Krzesicki |
| 2005/0040284 | A1 | 2/2005 | Christensen et al. |
| 2006/0243075 | A1 | 11/2006 | Liou et al. |
| 2010/0282901 | A1 | 11/2010 | Mason |
| 2011/0072780 | A1 | 3/2011 | Somerfield et al. |
| 2011/0234021 | A1 | 9/2011 | Eckstein et al. |
| 2013/0106215 | A1 | 5/2013 | Shigetomo et al. |
| 2015/0285349 | A1 | 10/2015 | Pizzoni et al. |
| 2016/0025199 | A1 | 1/2016 | Boone et al. |
| 2016/0195115 | A1 | 7/2016 | Fenn et al. |
| 2016/0325342 | A1 | 11/2016 | Gostylla et al. |
| 2018/0172121 | A1 | 6/2018 | Potter et al. |
| 2018/0208298 | A1 | 7/2018 | Cottet et al. |
| 2018/0335115 | A1 | 11/2018 | Hawksworth et al. |

FOREIGN PATENT DOCUMENTS

| | | | | |
|---|---|---|---|---|
| CN | 107407384 | A * | 11/2017 | ............ F16H 25/20 |
| CN | 109923333 | | 6/2019 | |
| CN | 109923333 | A * | 6/2019 | ............ F16C 19/16 |
| EP | 1902947 | | 3/2008 | |
| JP | 2002276765 | | 9/2002 | |
| JP | 2002276765 | A * | 9/2002 | |
| JP | 2007114096 | | 5/2007 | |
| JP | 2007114096 | A * | 5/2007 | |

OTHER PUBLICATIONS

USPTO, Notice of Allowance dated Nov. 4, 2019 in U.S. Appl. No. 15/599,318.

European Patent Office, Extended European Search Report dated Jul. 23, 2018 in Application No. 18172734.8.

USPTO, Notice of Allowance dated Sep. 28, 2022 in U.S. Appl. No. 16/776,202.

* cited by examiner

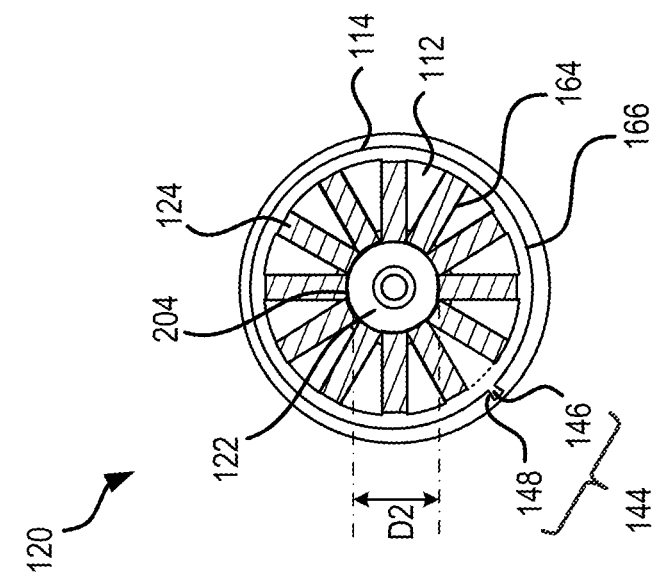
FIG.5B
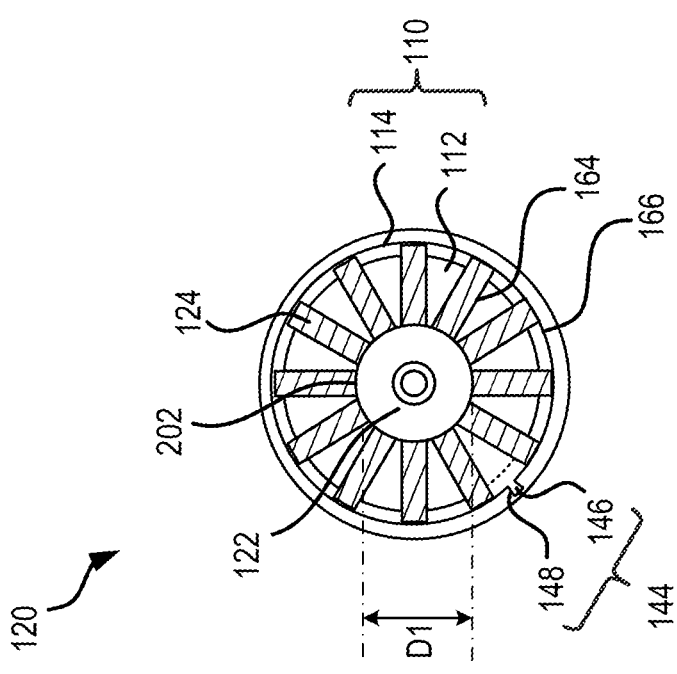
FIG.5A
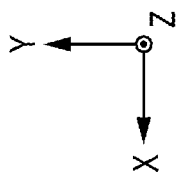

ELECTROMECHANICAL ACTUATOR DISCONNECT

CROSS REFERENCE TO RELATED APPLICATIONS

This application is a divisional of, claims priority to and the benefit of U.S. patent application Ser. No. 16/776,202, filed on Jan. 29, 2020, and entitled "ELECTROMECHANICAL ACTUATOR DISCONNECT." The '202 application is a divisional of, claims priority to and the benefit of U.S. patent application Ser. No. 15/599,318, filed on May 18, 2017, and entitled "ELECTROMECHANICAL ACTUATOR DISCONNECT," which issued as U.S. Pat. No. 10,583,917 on Mar. 10, 2020. All of which are incorporated by reference herein in their entirety for all purposes.

FIELD

The present disclosure relates to landing gear, and, more specifically, to release systems for electric landing gear actuators.

BACKGROUND

Aircraft often include one or more landing gear that comprise one or more wheels. Retractable aircraft landing gear for aircraft are typically stowed in the aircraft structure and are deployed during takeoff and landing events. Retractable landing gear may typically include a shock strut having an upper end pivotally mounted to the frame of the aircraft about a retraction axis for pivotal displacement between a vertical, downwardly extending, landing and ground support position, and a horizontal retracted position nested within a wheel well in a lower surface of the aircraft wing or fuselage.

SUMMARY

Systems and methods disclosed herein may be useful for an electromechanical actuator for a landing gear system. An electromechanical actuator may include a motor assembly and a ball nut. A split ball screw may be disposed between the motor assembly and the ball nut. The split ball screw may have an inner portion and an outer portion. The inner portion may interface with the motor assembly. The outer portion may interface with the ball nut. A pin may be configured to engage with the inner portion and the outer portion of the split ball screw to couple the outer portion with the inner portion.

In various embodiments, the outer portion of the split ball screw may be concentric with the inner portion of the split ball screw. The electromechanical actuator may further comprise an actuator release assembly. The actuator release assembly may comprise a hub disposed radially inward of the pin. A spring may be coupled to the hub to form a biasing member configured to bias the pin into a groove in the outer portion of the split ball screw. The hub may comprise a first hub portion having a first diameter and a second hub portion having a second diameter. The first hub portion may be configured to contact the pin to hold the pin in the groove in the outer portion of the split ball screw. The electromechanical actuator may further comprise a lever configured to rotate about a pivot. A link may be coupled between the hub and the lever. A cable may be coupled to the lever. The cable may be configured to rotate the lever. The lever may be configured to exert a force on the link. The link may be configured to compress the spring to move the hub. The second hub portion may be configured to disengage the pin from the outer portion of the split ball screw.

A landing gear is also provided. The landing gear may comprise a strut and an electromechanical actuator coupled to the strut. The electromechanical actuator may comprise a motor assembly, a ball nut, and a split ball screw disposed between the motor assembly and the ball nut. An actuator release assembly may be coupled to the split ball screw.

In various embodiments, the split ball screw may include an inner portion concentric with an outer portion. The inner portion may have an aperture aligned with a groove of the outer portion. The actuator release assembly may comprise a hub disposed radially inward of the split ball screw. A pin may extend radially outward from the hub and through the aperture in the inner portion of the split ball screw. A spring may be coupled to the hub to form a biasing member configured to bias the pin into the groove in the outer portion of the split ball screw. The pin may be disposed in the groove and may couple the outer portion with the inner portion of split ball screw. The hub may comprise a first hub portion having a first diameter and a second hub portion having a second diameter. The first hub portion may be configured to contact the pin to hold the pin in the groove in the outer portion of the split ball screw. The actuator release assembly may be configured to decouple the outer portion from the inner portion of the split ball screw to decouple the ball nut from the motor assembly. The landing gear may be configured to deploy in response to the actuator release assembly decoupling the ball nut from the motor assembly.

A method of operating an electromechanical actuator is also provided. The method may comprise the steps of coupling an inner portion of a split ball screw with an outer portion of the split ball screw, and rotating the split ball screw about an axis to drive a ball nut in a first axial direction. In response to a failure mode of the electromechanical actuator, the method may include the steps of decoupling the outer portion of the split ball screw from the inner portion of the split ball screw, and translating the outer portion of the split ball screw and the ball nut in a second axial direction.

In various embodiments, the step of coupling the inner portion with the outer portion may further comprise applying a biasing force, by a biasing member, to a pin configured to engage with the inner portion and the outer portion. The step of decoupling the inner portion from the outer portion may further comprise applying a force to the biasing member to remove the biasing force from the pin. Removing the biasing force from the pin may disengage the pin from the outer portion of the split ball screw. The method may further comprise reengaging the pin into the outer portion of the split ball screw in response to removing the failure mode of the electromechanical actuator. The step of translating the outer portion of the split ball screw and the ball nut in the second axial direction may further comprise passively deploying a landing gear coupled to the electromechanical actuator.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 5A and 5B illustrate a cross-sectional view of an electromechanical actuator for a landing gear, in accordance with various embodiments.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for electric landing gear actuation systems, and more particularly, for releasing an electromechanical actuator assembly for emergency deployment of aircraft landing gear. An electromechanical actuator may be used in the retraction and deployment of retractable landing gear.

Figure 1:
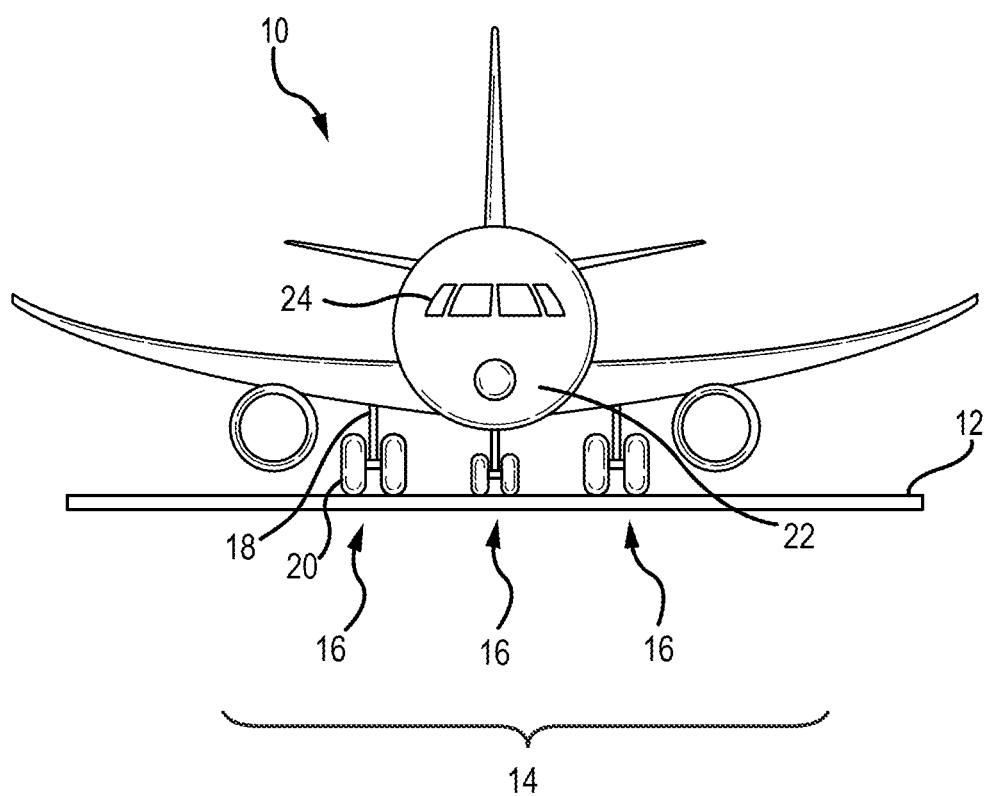
FIG. 1 illustrates an aircraft in accordance with various embodiments.
Figure 2:
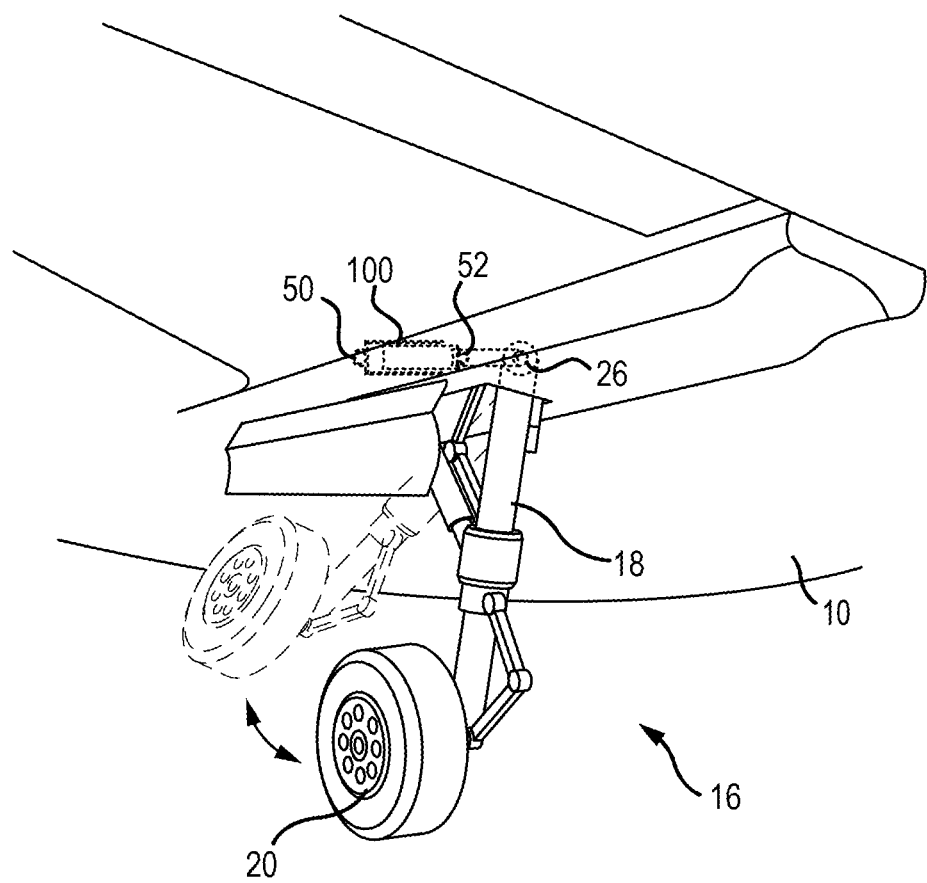
FIG. 2 illustrates a perspective view of the retractable landing gear employed on the aircraft of FIG. 1, in accordance with various embodiments.

With reference to FIG. 1, aircraft 10 on runway 12 is shown, in accordance with various embodiments. Aircraft 10 may comprise a landing gear system 14 comprising one or more landing gear 16 each coupled to one or more wheel and brake assemblies. Landing gear 16 may further comprise a strut, shock strut, bogie beam, axle and/or other structure, coupled to one or more wheels of the landing gear 16. For example, each landing gear 16 may include a strut 18, which supports one or more wheels 20. In various embodiments, landing gear 16 may comprise deployable and/or retractable landing gear (e.g., as depicted in FIG. 2). Aircraft 10 may comprise a controller 22 and pilot controls 24. Landing gear system 14 may be in communication with controller 22 and/or pilot controls 24 and may receive commands from controller 22 and/or pilot controls 24, for example, to deploy or to retract landing gear 16.

With reference to FIG. 2, aircraft 10 having a retractable landing gear is shown, in accordance with various embodiments. A strut 18 of landing gear 16 may have an upper end pivotally mounted to the aircraft 10 at a pivot 26. Landing gear 16 may further comprise an electromechanical actuator 100 operatively associated with the strut 18 and configured to drive the deployment and/or stowing of landing gear 16. Strut 18 may be rotatable about pivot 26 in response to electromechanical actuator 100 applying a force to an arm and/or joint of strut 18.

Figure 3A:
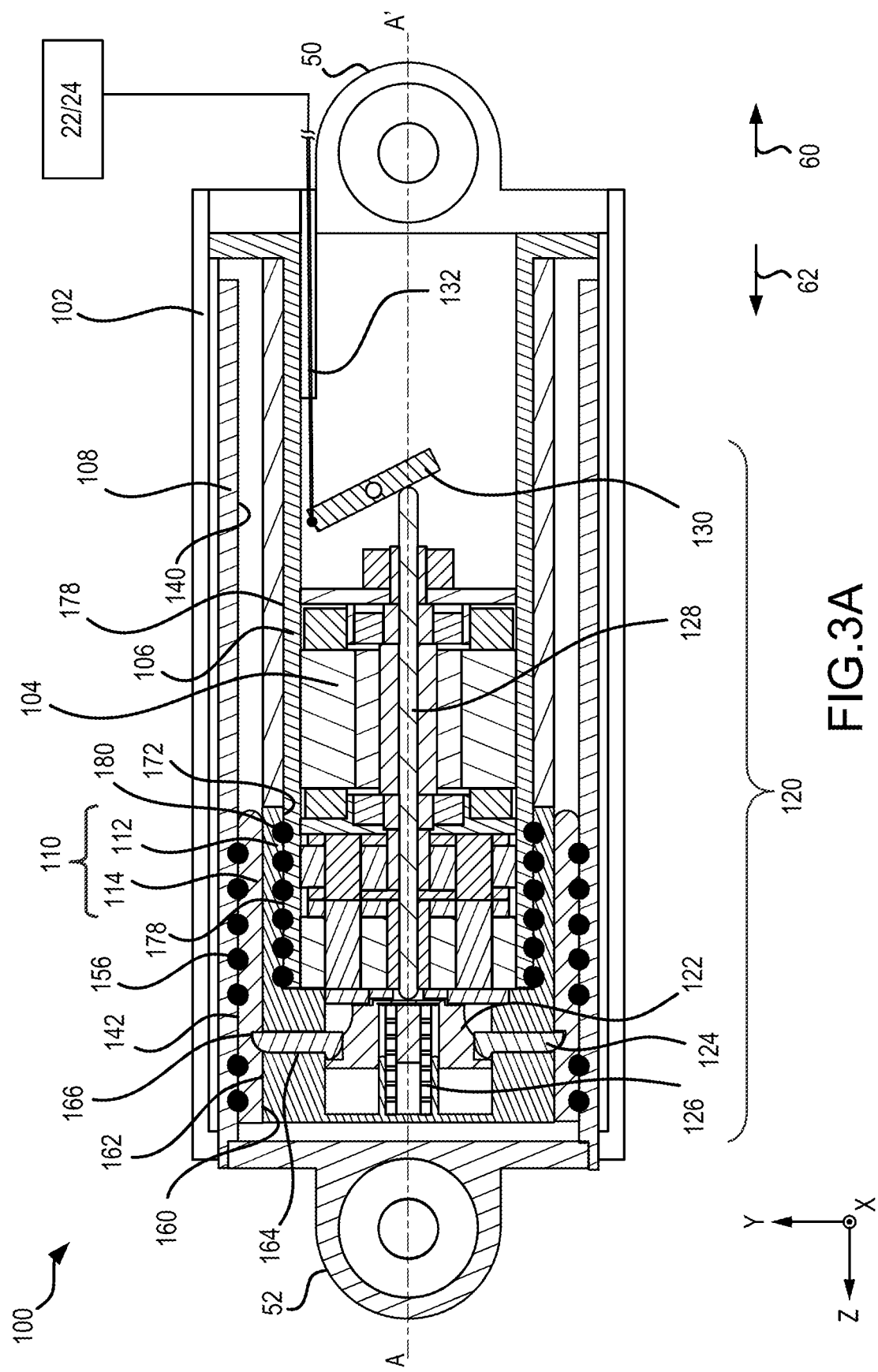
FIGS. 3A and 3B illustrate cross-sectional views of a landing gear electromechanical actuator with a release assembly, in accordance with various embodiments.

With reference to FIGS. 2 and 3A, electromechanical actuator 100 includes opposing ends 50, 52 that are coupled to the aircraft 10 and/or strut 18. Electromechanical actuator 100 may be configured to extend/retract to move landing gear 16 from a retracted position to a deployed position and from a deployed position to a retracted (stowed) position. In various embodiments, electromechanical actuator 100 may be configured to extend, causing landing gear 16 to rotate about pivot 26 into a position for stowage, i.e., a retracted position. Actuator 100 may be configured to retract causing landing gear 16 to rotate about pivot 26 into a deployed position. For purposes of illustration, electromechanical actuator 100 will be discussed as extending to stow landing gear 16, and retracting to deploy landing gear 16. However, it will be understood from this disclosure that, in various embodiments, electromechanical actuator 100 may be configured to extend in order to deploy landing gear 16, and retract in order to stow landing gear 16.

Figure 3B:
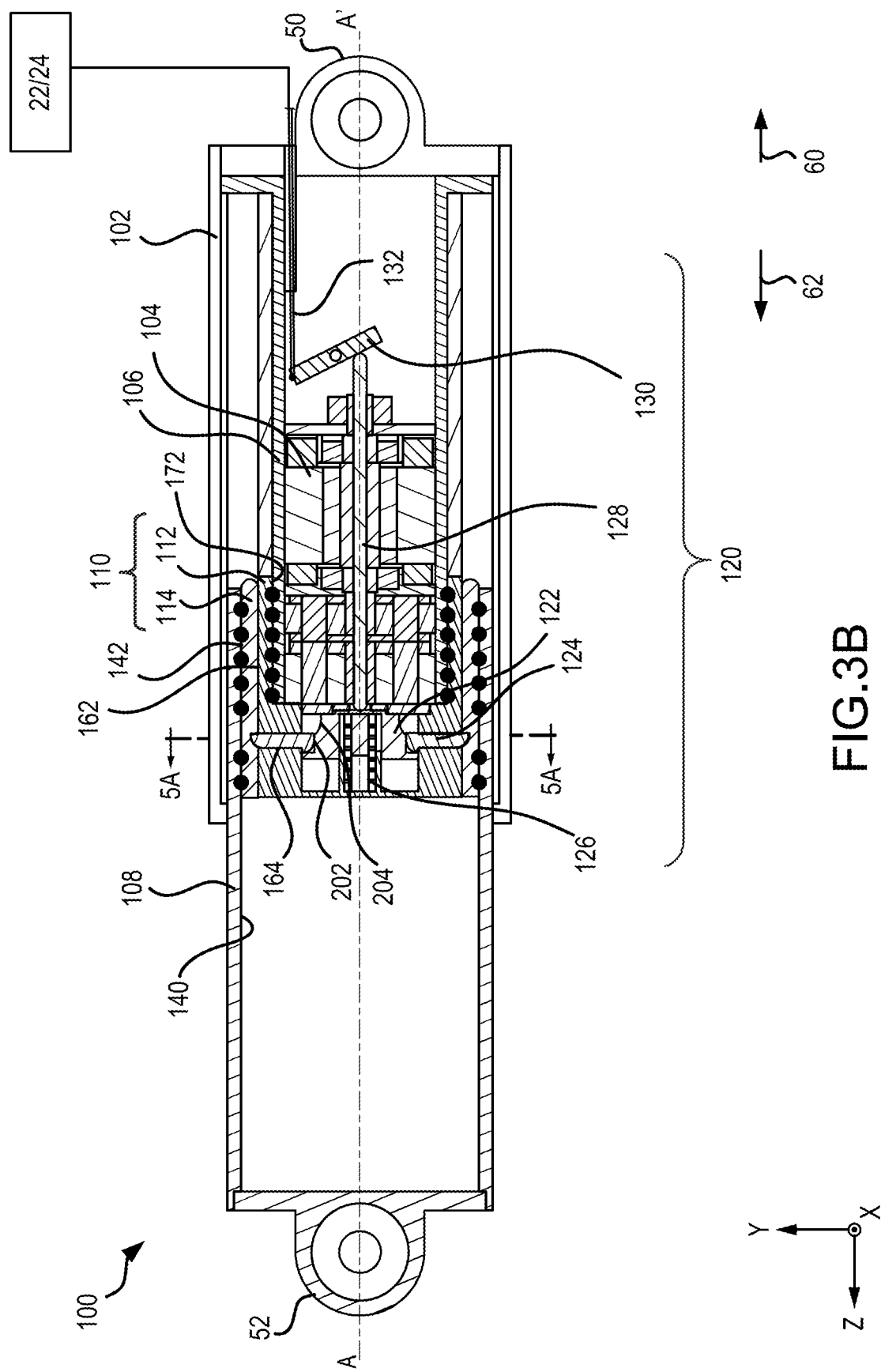

With reference to FIGS. 3A and 3B, an electromechanical actuator 100 for a retractable landing gear is shown, in accordance with various embodiments. Electromechanical actuator 100 may be configured to convert an internal rotary motion by a motor assembly 104 to linear motion of one or more actuator components. The electromechanical actuator 100 may extend along an axis A-A', i.e., along the z-direction on the provided x-y-z axes. For ease of illustration, a proximal end 50 of electromechanical actuator 100 will refer to an end of electromechanical actuator 100 near A' on the axis A-A', while a distal end 52 of electromechanical actuator 100 will refer to an end of electromechanical actuator 100 near A on the axis A-A'. Further, the distal direction 62 will refer to the positive z-direction, i.e., toward A, while the proximal direction 60 will refer to the negative z-direction, toward A'. The proximal direction 60 may be 180 degrees opposite to the distal direction 62.

In various embodiments, electromechanical actuator 100 may comprise a housing 102, a motor assembly 104, a ball nut 108, a split ball screw 110, and an actuator release assembly 120. Motor assembly 104 may be disposed within a motor housing 106. Generally, motor assembly 104 may rotate and may drive the split ball screw 110 through a plurality of rotations. Housing 102 may comprise a generally annular structure configured to house a ball nut 108 and extending along the axis A-A'. Ball nut 108 may be generally annular and extend axially along the axis A-A' within housing 102. The rotation of split ball screw 110 may drive the ball nut 108 linearly in an axial direction (z-direction) relative to housing 102, split ball screw 110, motor assembly 104, and motor housing 106.

Split ball screw 110 may comprise a generally annular structure that extends axially along the axis A-A' within ball nut 108. In various embodiments, split ball screw 110 may comprise a ball screw which is divided into two annular portions, an inner portion 112 and an outer portion 114. Outer portion 114 may be disposed around inner portion 112 in a concentric and/or coaxial arrangement. Inner portion 112 and outer portion 114 coupled together may operate as a unitary ball screw. Split ball screw 110 may further be configured such that outer portion 114 may be decoupled from inner portion 112. In response to outer portion 114 being decoupled from inner portion 112, outer portion 114 may translate axially relative to inner portion 112.

In various embodiments, an actuator release assembly 120 may be configured to engage and disengage the split ball screw 110 by mechanically coupling and decoupling outer portion 114 with inner portion 112. Actuator release assembly 120 may comprise a one or more pins 124, which may couple outer portion 114 with inner portion 112. Pins 124 may be configured to restrict linear translation of outer portion 114 relative to inner portion 112.

Referring still to FIGS. 3A and 3B, actuator release assembly 120 is shown in a state for engaged operation of electromechanical actuator 100, i.e., split ball screw 110 is engaged with ball nut 108 and motor housing 106 to drive ball nut 108 by the rotation of split ball screw 110. Pins 124 of actuator release assembly 120 are engaged with both inner portion 112 and outer portion 114 of split ball screw 110, thereby coupling together the inner portion 112 and the outer portion 114 of split ball screw 110. During engaged operation of electromechanical actuator 100, inner portion 112 and the outer portion 114 of split ball screw 110 operate as a unitary structure and rotate together about an axis A-A'.

A radially inner surface 140 of ball nut 108 may be helically threaded, and for example, may define a helical track on radially inner surface 140 of ball nut 108. Likewise, split ball screw 110 may comprise one or more translation bearing tracks defined in a radially outer surface 142 of outer portion 114. The translation bearing tracks in radially outer surface 142 may comprise annular or substantially annular grooves and/or channels. Thus, radially outer surface 142 of outer portion 114, which is also the radially outer surface 142 of split ball screw 110, may be helically threaded. Split ball screw 110 may be housed within ball nut 108, and the threading on radially outer surface 142 of split ball screw 110 may interface with or mate with the threading on the inner surface of ball nut 108. Ball nut 108 may be disposed at least partially around split ball screw 110 such that one or more translation bearing tracks of split ball screw 110 and helical track of ball nut 108 align to form a translation bearing raceway. A plurality of bearings 156 may be disposed within the translation bearing raceway between split ball screw 110 and ball nut 108. In various embodiments, bearings 156 may be spheres, non-spherical rolling bearings, cylindrical rollers, or other suitable bearings. During operation, split ball screw 110 may rotate about an axis A-A'. As split ball screw 110 rotates, the threading on radially outer surface 142 of split ball screw 110 may cooperate with the threading on radially inner surface 140 of ball nut 108 to drive ball nut 108 in an axial direction (z-direction).

As discussed above, split ball screw 110 may be circumferentially split into inner portion 112 and outer portion 114, which are held in an engaged position by one or more pins 124 of actuator release assembly 120. A radially inner surface 160 of outer portion 114 may be in contact with a radially outer surface 162 of inner portion 112. Inner portion 112 of split ball screw 110 may comprise one or more apertures 164 defined generally radially through inner portion 112, from a radially inner surface 172 to a radially outer surface 162. Apertures 164 may be configured to receive pins 124. Outer portion 114 may define a groove 166 in radially inner surface 160 of outer portion 114. Groove 166 may be a continuous circumferential groove in radially inner surface 160, and may be configured to receive pins 124. Further, actuator release assembly 120 may include a plurality of circumferential grooves, such as groove 166, spaced axially along radially inner surface 160 of outer portion 114, i.e. at different axial locations. Actuator release assembly 120 may include multiple sets of pins, such as pins 124, spaced axially and with substantially the same spacing as the plurality of grooves in outer portion 114. Inner portion 112 may include multiple sets of apertures, such as apertures 164, in which the pins 124 are disposed. Pins 124 disposed through apertures 164 and groove 166 operate to resist the relative movement of inner portion 112 and outer portion 114 in an axial direction (z-direction). In various embodiments, pins 124 may be configured to resist the relative movement of inner portion 112 and outer portion 114 in an axial direction (z-direction) and a circumferential direction. In various embodiments, in addition to pins 124, which may be engaged to resist relative axial movement between inner portion 112 and outer portion 114, split ball screw 110 may further comprise fixed anti-rotation tabs, which resist relative circumferential movement between inner portion 112 and outer portion 114.

Referring still to FIGS. 3A and 3B and now to FIGS. 5A and 5B, split ball screw 110 may comprise an anti-rotation interlock 144 configured to restrict circumferential movement of outer portion 114 with respect to inner portion 112, but to permit axial translation of outer portion 114 with respect to inner portion 112. In various embodiments, split ball screw 110 may comprise one or more splines or anti-rotation tabs 146. An anti-rotation tab 146 may extend radially from radially outer surface 162 of inner portion 112 of split ball screw 110, and may further extend axially along at least a portion of radially outer surface 162, parallel to axis A-A'. The one or more anti-rotation tabs 146 may couple inner portion 112 with outer portion 114 to resist relative circumferential movement, but permit relative axial movement, of outer portion 114 with respect to inner portion 112. Outer portion 114 of split ball screw 110 may comprise one or more anti-rotation grooves 148 formed in radially inner surface 160 of outer portion 114. Anti-rotation tab 146 may mechanically couple with anti-rotation groove 148 to form the anti-rotation interlock 144. As torque is applied to inner portion 112 of split ball screw 110 by motor assembly 104, the anti-rotation interlock 144 may conduct this torque into outer portion 114 and prevent outer portion 114 from rotating in response to the torque. Split ball screw 110 may comprise any number of anti-rotation tabs 146 and anti-rotation grooves 148 sufficient to withstand a given magnitude and impulse of force. With inner portion 112 and outer portion 114 coupled together by at least one anti-rotation tab 146 and one anti-rotation groove 148, split ball screw 110 may rotate as a unitary ball screw. For purposes of illustration, split ball screw 110 is discussed as having an anti-rotation tab 146 on inner portion 112 and as having an anti-rotation grooves 148 in outer portion 114. However, it will be understood from this disclosure that, in various embodiments, split ball screw 110 may have anti-rotation tab 146 and/or anti-rotation grooves 148 on inner portion 112 and/or outer portion 114. In various embodiments, the one or more anti-rotation tabs 146 comprise finger-like extensions extending from inner portion 112 and/or outer portion 114, and anti-rotation tabs 146 may comprise flanges, ridges, spline grooves, or any other apparatus configured to prevent rotation of outer portion 114 relative to inner portion 112.

Returning to FIGS. 3A and 3B, split ball screw 110 may further comprise one or more thrust bearing tracks defined in a radially inner surface 172 of inner portion 112, in accordance with various embodiments. The thrust bearing tracks may comprise annular or substantially annular grooves and/or channels disposed in a radially inward surface of split ball screw 110. Motor housing 106 may comprise a generally annular housing that extends axially along the axis A-A' at least partially radially inward of split ball screw 110. In various embodiments, motor housing 106 may comprise one or more tracks defined in a radially outer surface 178 of motor housing 106. The thrust bearing tracks on radially inner surface 172 of split ball screw 110 may interface with or mate with the tracks on the radially outer surface 178 of motor housing 106. In various embodiments, split ball screw 110 may be disposed at least partially around motor housing 106 such that one or more thrust bearing tracks of split ball screw 110 and one or more tracks of motor housing 106 align to form a thrust bearing raceway. A plurality of bearings 180 may be disposed within the thrust bearing raceway between split ball screw 110 and motor housing 106. In various embodiments, bearings 180 may be spheres, non-spherical rolling bearings, cylindrical rollers, or other suitable bearings.

A variety of drive components may be housed within the motor housing 106, such as, for example, an electromechanical drive motor, drive shaft, gearing system, and the like. A motor assembly 104 may be disposed within motor housing 106 and may be configured to drive the rotation of split ball screw 110. Motor housing 106 may comprise a stationary (non-rotating, non-translating) component. Split ball screw 110 may rotate relative to motor assembly 104 and motor housing 106. The rotation of split ball screw 110 may drive the linear translation of ball nut 108. Ball nut 108 may translate distally and/or proximally along axis A-A' (depending upon the direction of rotation of split ball screw 110).

FIG. 3B shows electromechanical actuator 100 in an extended position. Compared to the actuator position in FIG. 3A, FIG. 3B shows electromechanical actuator 100 after split ball screw 110 has been rotated by motor assembly 104 to drive ball nut 108 axially into an extended position. Ball nut 108 has translated in a distal direction 62. In various embodiments, the extension of electromechanical actuator 100 has rotated a landing gear 16 (FIG. 2) into a stowed position. In the event that a component of electromechanical actuator 100 fails and causes ball nut 108 to become stuck in the extended position, i.e., with landing gear 16 in the stowed position, actuator release assembly 120 may be employed to allow passive translation of ball nut 108. In this regard, actuator release assembly 120 may be configured to effectively decouple motor housing 106 from ball nut 108.

Figure 4A:
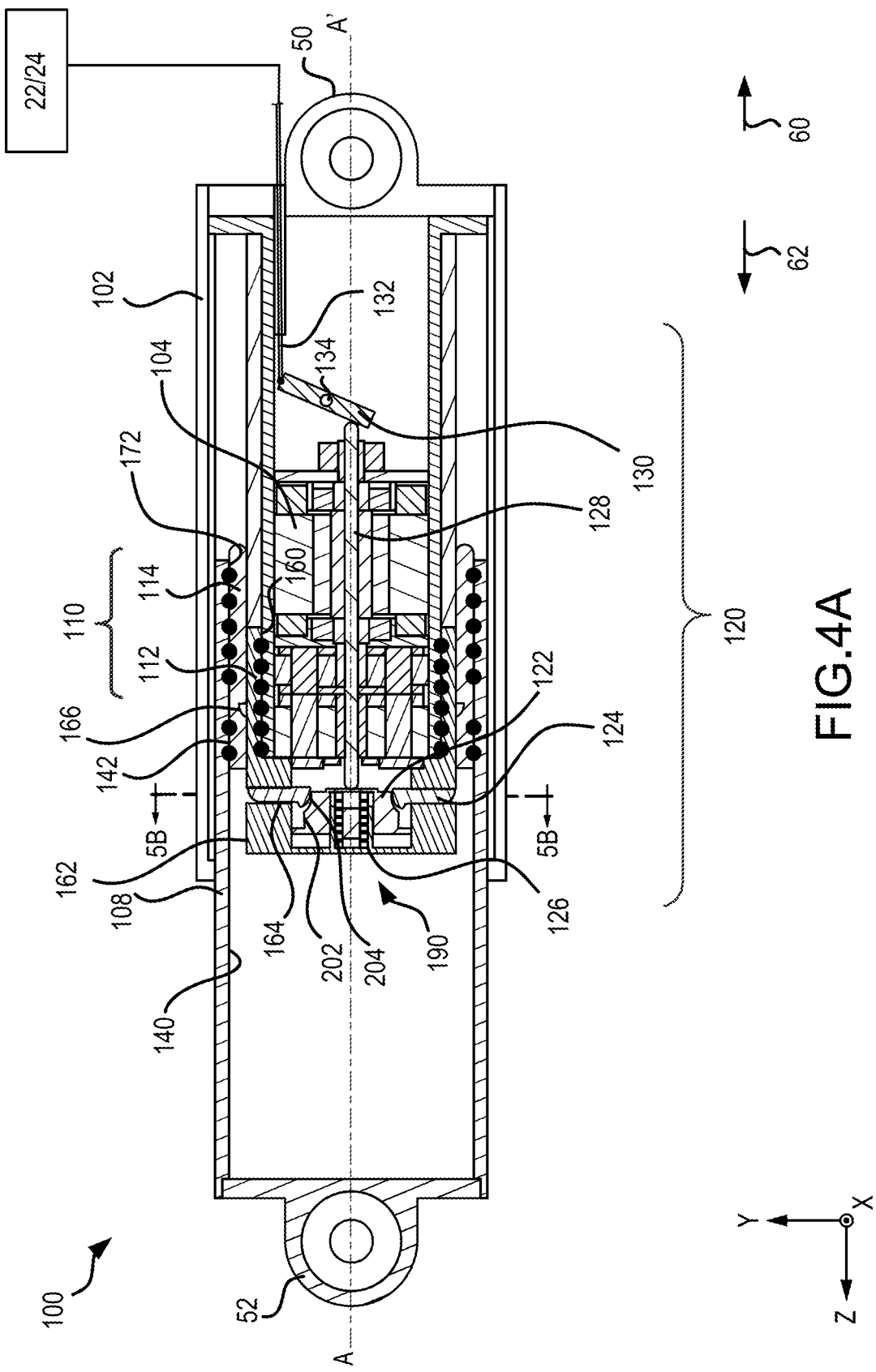
FIGS. 4A and 4B illustrate cross-sectional views of an electromechanical actuator with a release assembly, in accordance with various embodiments.
Figure 4B:
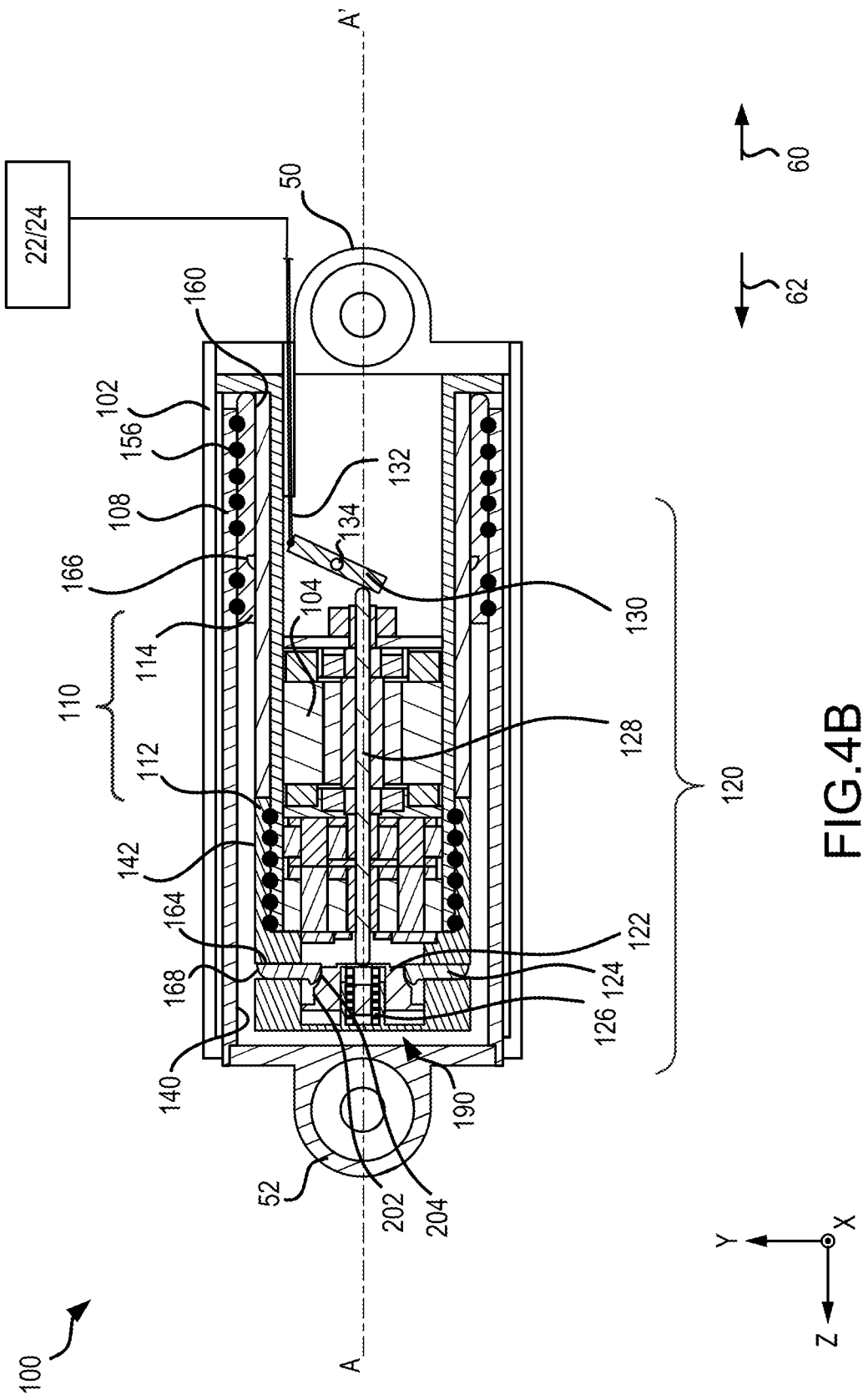

Referring to FIGS. 4A and 4B, the operation of actuator release assembly 120 is shown, in accordance with various embodiments. Actuator release assembly 120, may be in communication with controller 22 and/or pilot controls 24. Actuator 100 may receive a command from controller 22 and/or pilot controls 24 to disengage the electromechanical actuator 100, for example, in order to permit passive movement of the actuator components, and thus, a passive deployment of a landing gear 16 (FIG. 2.)

In various embodiments, actuator release assembly 120 may comprise a hub 122, one or more pins 124, a biasing member or spring 126, a link 128, a lever 130, and a force input member, such as a cable 132. Hub 122 may be disposed radially inward of split ball screw 110. Hub 122 may also be disposed radially inward of pins 124. One or more pins 124 may extend radially outward from hub 122 and through apertures 164 in inner portion 112 of split ball screw 110. Spring 126 may be configured to bias hub 122 in the proximal direction 60. Spring 126 may be coupled to hub 122 to form a biasing member 190 configured to bias each of pins 124 in a radially outward direction from hub 122, and into a groove 166 in outer portion 114 of split ball screw 110. Hub 122 may comprise a first hub portion 202 having a first diameter and a second hub portion 204 having a second diameter. The second diameter may be less than the first diameter. The first hub portion 202 may be configured to contact a pin 124 to hold the pin 124 in the groove 166 in outer portion 114 of split ball screw 110 (see also FIG. 3B). Stated differently, spring 126 applies a biasing force to hub 122 in the proximal direction 60, which causes first hub portion 202 to contact the one or more pins 124 and to apply a biasing force to the pins 124 in the radially outward direction. In this regard, biasing member 190 may be configured to apply a biasing force to the pins 124 to hold the split ball screw 110 in an engaged state, i.e., with outer portion 114 axially locked with inner portion 112 by one or more pins 124 (see FIG. 4A).

In various embodiments, the second hub portion 204 may be configured allow the pin 124 to move radially inward from outer portion 114, and disengage from groove 166. The lever 130 of actuator release assembly 120 may be configured to rotate about a pivot 134. Link 128 may be coupled between hub 122 and lever 130. Cable 132 may be coupled to lever 130 and may be configured to apply a force to lever 130. Thus, cable 132 may be configured to rotate the lever 130 about pivot 134. Lever 130 may be configured to exert a force on the link 128, which may be configured to compress spring 126 to move hub 122. In this regard, link 128 may be a rigid body configured to transfer a force from lever 130 to hub 122 and/or spring 126. By applying a force in the distal direction 62 to hub 122 and/or spring 126, a biasing force may be removed from pins 124. In response to engaging actuator release assembly 120, hub 122 moves in the distal direction 62 and second hub portion 204 may be positioned adjacent to pins 124. With the biasing force removed from pins 124, pins 124 may move radially inward relative to outer portion 114 of split ball screw 110, thereby disengaging outer portion 114 from inner portion 112.

It will be understood that actuator release assembly 120 may be configured to move hub 122 through other mechanisms, such as an actuated element, hydraulic element, manual element, or other mechanical element or the like. For example, a system of links may be configured to push or pull the hub 122 in the axial direction.

As discussed above, actuator release assembly 120 may be configured to disengage pin 124 from outer portion 114 of split ball screw 110. Disengaging pin 124 from outer portion 114 decouples outer portion 114 from inner portion 112 of split ball screw 110, which effectively decouples the ball nut 108 from motor assembly 104. In response to decoupling outer portion 114 from inner portion 112, outer portion 114 may translate axially with respect to inner portion 112. As outer portion 114 remains coupled to ball nut 108 by bearings 156, outer portion 114 of split ball screw 110 moves axially together with ball nut 108. With ball nut 108 effectively decoupled from motor assembly 104, ball nut 108 (with outer portion 114 of split ball screw 110) slides axially between housing 102 and radially outer surface 162 of inner portion 112 of split ball screw 110. Without impediment by motor assembly 104, the weight of landing gear 16 acting to compress electromechanical actuator 100 allows ball nut 108 to move in the proximal direction 60 relative to housing 102. Stated differently, gravity acts on landing gear 16 (see FIG. 2) to urge landing gear 16 from a stowed position to deployed position. In this regard, landing gear 16 tends to force housing 102 and ball nut 108 in the proximal direction (see FIG. 4B). With split ball screw 110 disengaged, the force of landing gear 16 acting on housing 102 and ball nut 108 is transferred to outer portion 114 of split ball screw 110 causing outer portion 114 of split ball screw 110 to passively slide in the proximal direction 60 relative to inner portion 112. In various embodiments, the pins 124 may comprise a taper or slope at the radially outer end 168 of the pins 124. As outer portion 114 of split ball screw 110 moves in the proximal direction 60, the outer portion 114 contacts radially outer end 168 of pins 124 and pushes the pins 124 radially inward toward hub 122. More specifically, outer portion 114 of split ball screw 110 exerts a force on pins 124 in the radially inward direction, and pins 124 move out of groove 166 and radially inward through apertures 164 and contact second hub portion 204. Outer portion 114 is thereby permitted to move axially relative to inner portion 112 of split ball screw 110. As housing 102, ball nut 108, and outer portion 114 move in the proximal direction 60, landing gear 16 deploys. Thus, landing gear 16 may be passively deployed without actuation, i.e., without energy applied, by electromechanical actuator 100.

FIG. 5A shows a cross section of a portion of electromechanical actuator 100 with actuator release assembly 120 taken along line 5A-5A from FIG. 3B. Actuator release assembly 120 is shown in a state for engaged operation of electromechanical actuator 100, as discussed above with respect to FIG. 3B. Pins 124 extend radially outward from a first hub portion 202 having a first diameter D1. Apertures 164 of inner portion 112 may be aligned with groove 166 in outer portion 114. Pins 124 extend completely through apertures 164 in inner portion 112 and into groove 166 of outer portion 114. First hub portion 202 contacts a radially inner portion of each pin 124, and may apply a force directed radially outward to hold pins 124 in grooves 166 of outer portion 114 of split ball screw 110.

FIG. 5B shows a cross section of a portion of electromechanical actuator 100 with actuator release assembly 120 taken along line 5B-5B from FIG. 4A. Actuator release assembly 120 is shown in a state with electromechanical actuator 100 disengaged, as discussed above with respect to FIG. 4A. As hub 122 moves axially (FIG. 4A), pin 124 may move radially inward into contact with a second hub portion 204 having a second diameter D2. Pins 124 move out of grooves 166 of outer portion 114, thereby decoupling outer portion 114 from inner portion 112 of split ball screw 110. In various embodiments, pins 124 may remain within apertures 164 in inner portion 112.

Upon realigning outer portion 114 with inner portion 112 of split ball screw 110, pins 124 may be reinserted into grooves 166 of outer portion 114, thereby recoupling outer portion 114 with inner portion 112.

Figure 6:
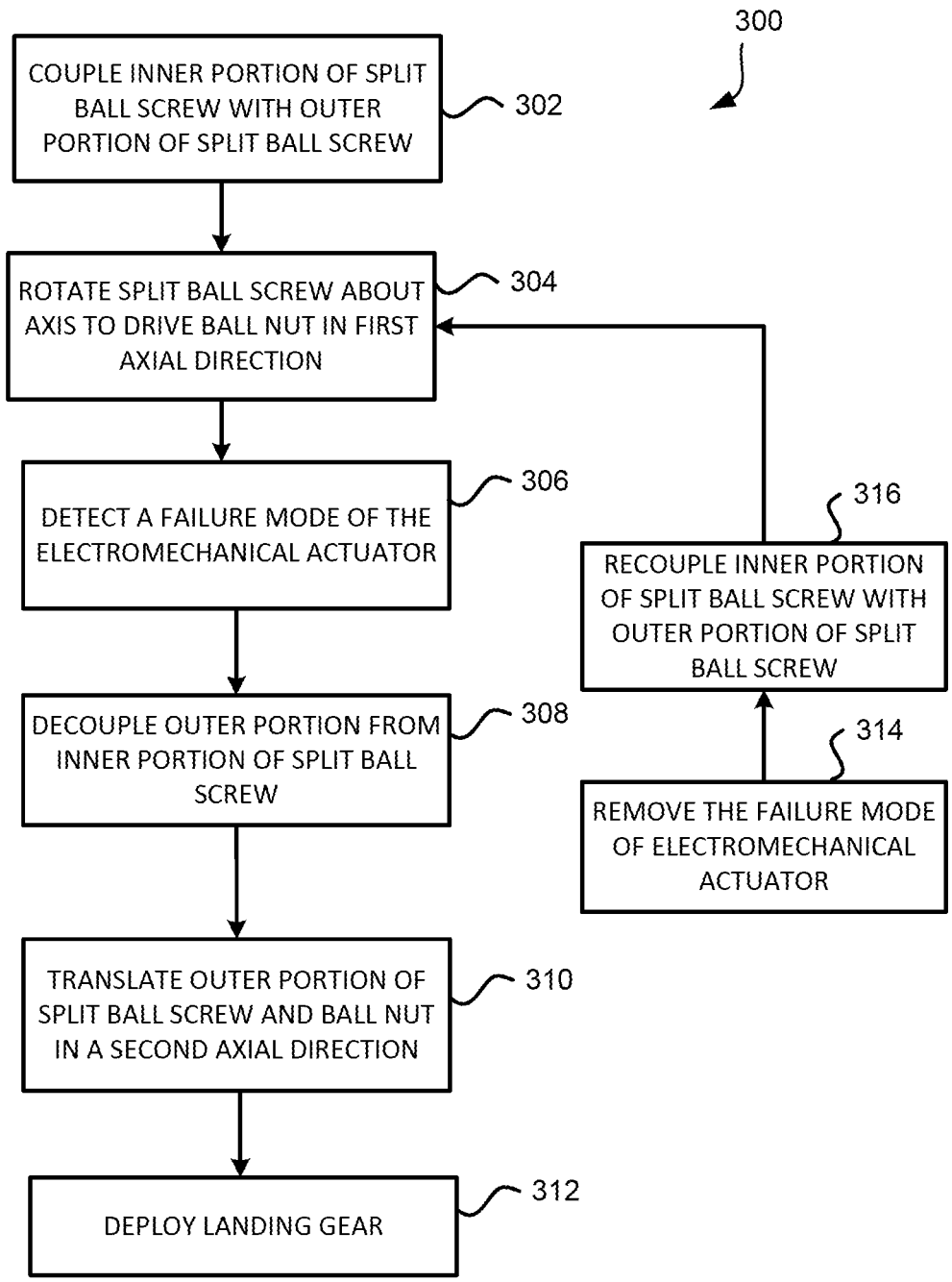
FIG. 6 illustrates a method of operating a electromechanical actuator for landing gear, in accordance with various embodiments.

FIG. 6 shows a method 300 of operating an electromechanical actuator 100, in accordance with various embodiments. Method 300 may include the steps of coupling an inner portion of a split ball screw with an outer portion of the split ball screw (step 302), rotating the split ball screw about an axis to drive a ball nut in a first axial direction (step 304), detecting a failure mode of the electromechanical actuator (step 306) in response to detecting the failure mode of the electromechanical actuator, decoupling the outer portion of the split ball screw from the inner portion of the split ball screw (step 308), translating the outer portion of the split ball screw and the ball nut in a second axial direction (step 310), and deploying a landing gear (step 312).

Step 302 may further include coupling the inner portion with the outer portion further comprising biasing, by a biasing member, a pin into engagement with inner portion and the outer portion. Spring 126 may be coupled to hub 122 to form the biasing member 190. The biasing member 190 having a spring 126 and hub 122 may be configured to apply a biasing force to the pin 124. Biasing member 190 may be configured to bias the pin 124 in a radially outward direction from hub 122 and into a groove 166 in outer portion 114 of split ball screw 110. A first hub portion 202 may be configured to contact a pin 124 and apply a biasing force in a radially outward direction to hold the pin 124 in the groove 166 in outer portion 114 of split ball screw 110 (see also FIG. 3B).

Step 308 may further include decoupling the inner portion from the outer portion further comprising applying a force to the biasing member to remove the biasing force from the pin. In various embodiments, removing the biasing force from the pin disengages the pin from the outer portion of the split ball screw. The second hub portion 204 may be configured allow the pin 124 to move radially inward from outer portion 114, and disengage from groove 166.

Step 312 may further include passively deploying a landing gear coupled to the electromechanical actuator.

After a detecting a failure by the electromechanical actuator, the electromechanical actuator may be reset and/or determined to be functional. Upon fixing the electromechanical actuator or otherwise removing the failure mode (step 314), an actuator release assembly may be reset. In that regard, method 300 may further include the step of recoupling the inner portion of the split ball screw with the outer portion of the split ball screw (step 316). Step 316 may further include reengaging the pin into the outer portion of the split ball screw in response to removing the failure mode of the electromechanical actuator. After removing the failure mode, any of steps 302 through 312 may be repeated.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operating an electromechanical actuator, comprising:

coupling an inner portion of a split ball screw with an outer portion of the split ball screw;

rotating the split ball screw about an axis to drive a ball nut in a first axial direction;

in response to a failure mode of the electromechanical actuator, decoupling the outer portion of the split ball screw from the inner portion of the split ball screw; and translating the outer portion of the split ball screw and the ball nut in a second axial direction.

2. The method of claim 1, wherein coupling the inner portion with the outer portion further comprises applying a biasing force, by a biasing member, to a pin configured to engage with the inner portion and the outer portion.

3. The method of claim 2, wherein decoupling the inner portion from the outer portion further comprises applying a force to the biasing member to remove the biasing force from the pin, wherein removing the biasing force from the pin disengages the pin from the outer portion of the split ball screw.

4. The method of claim 3, further comprising reengaging the pin into the outer portion of the split ball screw in response to removing the failure mode of the electromechanical actuator.

5. The method of claim 1, wherein translating the outer portion of the split ball screw and the ball nut in the second axial direction further comprises passively deploying a landing gear coupled to the electromechanical actuator.

* * * * *